United States Patent
Scaturro et al.

(10) Patent No.: US 6,925,458 B2
(45) Date of Patent: Aug. 2, 2005

(54) SYSTEM AND METHOD FOR PROVIDING AN ACTIVITY SCHEDULE OF A PUBLIC PERSON OVER A NETWORK

(76) Inventors: Michael A. Scaturro, 679 Third Pl. South, Garden City, NY (US) 11530; George Likourezos, 9321 Ridge Blvd., Brooklyn, NY (US) 11209-6706; Paul E. Scaturro, 679 Third Pl. South, Garden City, NY (US) 11530

( * ) Notice: Subject to any disclaimer, the term of this patent is extended or adjusted under 35 U.S.C. 154(b) by 313 days.

(21) Appl. No.: 09/741,416

(22) Filed: Dec. 20, 2000

(65) Prior Publication Data

US 2002/0078033 A1 Jun. 20, 2002

(51) Int. Cl.$^7$ .............................................. G06F 17/30
(52) U.S. Cl. ................................. 707/3; 707/4; 707/5
(58) Field of Search ............................. 725/53, 39, 86, 725/46, 153; 705/300, 26; 345/327, 333, 353, 721; 340/332; 364/188; 707/3, 4, 5

(56) References Cited

U.S. PATENT DOCUMENTS

| | | | | |
|---|---|---|---|---|
| 5,408,417 A | * | 4/1995 | Wilder | 705/5 |
| 5,855,006 A | * | 12/1998 | Huemoeller et al. | 705/9 |
| 5,873,095 A | * | 2/1999 | Gore | 345/781 |
| 5,949,411 A | * | 9/1999 | Doerr et al. | 345/716 |
| 6,208,974 B1 | * | 3/2001 | Campbell et al. | 705/2 |
| 6,369,840 B1 | * | 4/2002 | Barnett et al. | 345/853 |
| 6,462,662 B1 | * | 10/2002 | Rondow et al. | 340/573.1 |
| 6,564,380 B1 | * | 5/2003 | Murphy | 725/86 |
| 2001/0030661 A1 | * | 10/2001 | Reichardt | 345/721 |
| 2001/0034697 A1 | * | 10/2001 | Kaen | 705/37 |
| 2002/0112250 A1 | * | 8/2002 | Koplar et al. | 725/153 |
| 2003/0097657 A1 | * | 5/2003 | Zhou et al. | 725/46 |

OTHER PUBLICATIONS

A selection of web site pages from http://www.upcoming-movies.com, printed on Jan. 30, 2001, 13 pages.
A selection of web site pages from http://www.tvguide.com, printed on Jan. 30, 2001, 5 pages.

* cited by examiner

*Primary Examiner*—Charles Rones
*Assistant Examiner*—Neveen Abel-Jalil
(74) *Attorney, Agent, or Firm*—George Likourezos

(57) ABSTRACT

A system and method are disclosed for providing timely and efficient scheduled media information of upcoming media activities of public persons to interested individuals over a network, such as the Internet. The present invention allows individuals to request upcoming media activities of public persons via a network and be provided with such information via a search engine having access to at least one media schedule database. The system includes a media schedule database storing scheduled media activities of a plurality of public persons and a database manager for creating and revising records of the media schedule database. The database manager is preferably a computer system having access to the media schedule database for revising, appending, deleting, etc. data stored within the media schedule database and for adding data within the media schedule database. The database manager also has access to a server of the system for automatically receiving media schedule data via a network, such as the Internet, and for routing via the server the media information to the interested individuals.

31 Claims, 4 Drawing Sheets

400

420

Archimide Search Results for: Serena Roberts

TV Appearances: ←—401
The REGIS SHOW August 12, 2001 NBC Channel 7 9:00 am ~401a
LATENIGHT with Lefty Letterman August 14, 2001 CBS Channel 2 11:30 pm ~401b
GOOD MORNING NEW YORK August 22, 2001 ABC Channel 4 8:00 am ~ 401c Magazines:
PEEK August issue "A Dream Come True" Serena Roberts ~403a ← 403
INTERVIEW NOW September Issue ~403b Internet:
AOL live chat August 4, 2001 7:00 pm ←405

Radio: ←407
Herman Stern Show August 10 time TBA

Live Appearances:
Broadway Mall, Atlanta Georgia August 8, 2001 8:00 to 9:00 am ← 409

STEP ONE:
Enter your zip code so that we can do and exact channel match for your area: /308

STEP TWO:
Select the type of television service that comes into your home:
○ CABLE /310
○ SATELLITE /312
○ BROADCAST /314

STEP THREE:
Select the provider of your cable service:
○ ACME CABLE /316
○ METRO CABLE /318

400

420

Archimide Search Results for: Serena Roberts

TV Appearances: ←—401
The REGIS SHOW August 12, 2001 NBC Channel 7 9:00 am ~401a
LATENIGHT with Lefty Letterman August 14, 2001 CBS Channel 2 11:30 pm ~401b
GOOD MORNING NEW YORK August 22, 2001 ABC Channel 4 8:00 am ~ 401c Magazines: ←— 403
PEEK August issue "A Dream Come True" Serena Roberts ~403a
INTERVIEW NOW September Issue ~403b Internet: ←— 405
AOL live chat August 4, 2001 7:00 pm Radio: ←— 407
Herman Stern Show August 10 time TBA Live Appearances: ←— 409
Broadway Mall, Atlanta Georgia August 8, 2001 8:00 to 9:00 am

Figure 4

SYSTEM AND METHOD FOR PROVIDING AN ACTIVITY SCHEDULE OF A PUBLIC PERSON OVER A NETWORK

BACKGROUND OF THE INVENTION

1. Field of the Invention

The invention relates in general to computer networks. In particular, the invention relates to a system and method for providing activity schedules, such as itineraries, of public persons over a network. More particularly, the invention relates to a system and method for providing a listing of the times, dates, and venues of scheduled media activities of public persons over a network, such as the Internet.

2. Description of the Related Art

Public persons, especially those which have achieved celebrity status, connote privilege, respect, and adulation from countless numbers of adoring fans throughout the world. However, along with such privilege exists a host of professional obligations which may include, for example, radio, magazine and newspaper interviews, television and public appearances (e.g., book signings, conventions, movie premieres, etc.), and recently, hosting chat room sessions on the world wide web. The general public's ability to track the numerous scheduled (and even non-scheduled) activities of public persons has become a daunting task in a fast-paced media society. A fan often learns to his/her consternation that a scheduled media activity or public event involving one of their favorite public persons has occurred without the fan having been made aware, informed and/or notified. For example, a fan may not have been aware that a favorite celebrity has appeared on a television broadcast or made an appearance at a mall or trade show. This is disconcerting to the fan. The fan could have only learned of the appearance of the public person through happenstance or by calling the public person's publicist; a task which is generally impractical or non-convenient.

Accordingly, there exists a need for a system and method for obtaining and coordinating the multitude of scheduled media activities for the countless number of public persons throughout the world and for providing network users of such information in an effortless, timely, and efficient manner.

SUMMARY OF THE INVENTION

A system and method are disclosed herein for providing timely and efficient scheduled media information of upcoming media activities of public persons to interested individuals over a network, such as the Internet. The present invention allows individuals to request upcoming media activities of public persons via a network and be provided with such information via a search engine having access to at least one media schedule database.

The system of the present invention includes a media schedule database storing scheduled media activities of a plurality of public persons. The media schedule database is preferably a relational database, i.e., the database relates scheduled media activities with respective public persons and vice versa. The system of the present invention further includes a database manager for creating and revising records of the media schedule database. The database manager is preferably a computer system having access to the media schedule database for revising, appending, deleting, etc. data stored within the media schedule database and for adding data within the media schedule database. The database manager also has access to a server of the system of the present invention for automatically receiving media schedule data via a network, such as the Internet. Further, the database manager is capable of directing the server to obtain information which is unavailable within the media schedule database via the Internet. The obtained information is routed to the database manager which is then automatically or manually processed and subsequently stored in the media schedule database.

It is contemplated, for example, that the database query search engine sends a query, e.g., via the server, to at least one network address, e.g., the network address of a celebrity's publicist, requesting updated schedule media activity information regarding one or more celebrities which is not stored within the media schedule database to be transmitted and stored within the media schedule database.

It is further contemplated that a celebrity's publicist or manager is provided with an access code for accessing the media schedule database for providing media activity information regarding one or more celebrities, and for revising, appending, deleting, etc. data stored within the media schedule database pertaining to the celebrity the publicist or manager is representing.

In operation, the database query search engine receives a query from a user, for example, by the user accessing a web site, via wired or wireless means over the Internet, where the web site is maintained or operated by the server of the system. The database query search engine, in response to the query, then searches the media schedule database for information satisfying the received query. The information satisfying the query is then transmitted via the Internet to a user's computer system where the information is displayed to the user. The information satisfying the received query generally contains at least the name of a public person and a venue, for example, a radio station, a book store, or an arena, where the public person is scheduled to appear. Preferably, the media schedule information satisfying the user query includes a listing of media categories where each media category includes one or more scheduled media events concerning the public person provided in the user query. The displayed listing of media categories may include, for example, listings of upcoming television and radio appearances, live appearances, and Internet chat time.

According to one aspect of the present invention, a supplemental media category is also included, where applicable, which lists recent print publications (e.g., books, magazines, etc.) mentioning the public person.

According to another aspect of the present invention, in response to a request for a public person, the displayed information further includes the names of public persons related in some manner to the public person requested in the user query. For example, if the user query requests the media scheduled activities of a specific cast member of a soap opera, then the media scheduled activities of other cast members of the same soap opera would be provided to the user. It is also contemplated for the user to request the media scheduled activities of a group of public persons having a common relationship. For example, the user query can request the media scheduled activities of all individuals affiliated with a specific soap opera, corporation, or sport. As a further example, the query could request the media scheduled activities of the justices of the Supreme Court of the United States.

According to another aspect of the present invention, the user may click on a particular listed media event provided to the user in response to the query, to retrieve, through a hyperlink, further information or even a service directly from a specific media venue's web site or mirror web site. For example, the user may purchase tickets to at least one displayed scheduled media activity by clicking an icon on the display and connecting via the Internet to the media venue's ticketing web site for entering the appropriate information required to purchase the tickets.

According to another aspect of the present invention, the user is notified via e-mail whenever information corresponding to a public person of which the user has an interest in is updated in the media schedule database. The e-mail could include the updated information and/or could include a hyperlink to the web site maintained or operated by the server of the system for viewing the updated information.

Traditional media information resources such as television guide, newspapers, magazines, and radio are too numerous and too dynamic to allow an individual to keep pace with the countless never-ending scheduled media events of public persons throughout the world. The present invention provides a system and method for centralizing, managing and providing schedule media information of public persons to a user in a manner which permits real-time access and timely up-to-date information. The system and method of the present invention enables the user to effectively search and retrieve the scheduled media activities of public persons throughout the world in a timely and efficient manner.

BRIEF DESCRIPTION OF THE DRAWINGS

The foregoing features of the present invention will become more readily apparent and may be understood by referring to the following detailed description, taken in conjunction with the accompanying drawings, where:

FIG. 4 is a listing of scheduled media events provided for a specific public person by the server of the inventive system in response to a user query.

DETAILED DESCRIPTION OF THE PREFERRED EMBODIMENTS

Figure 1:
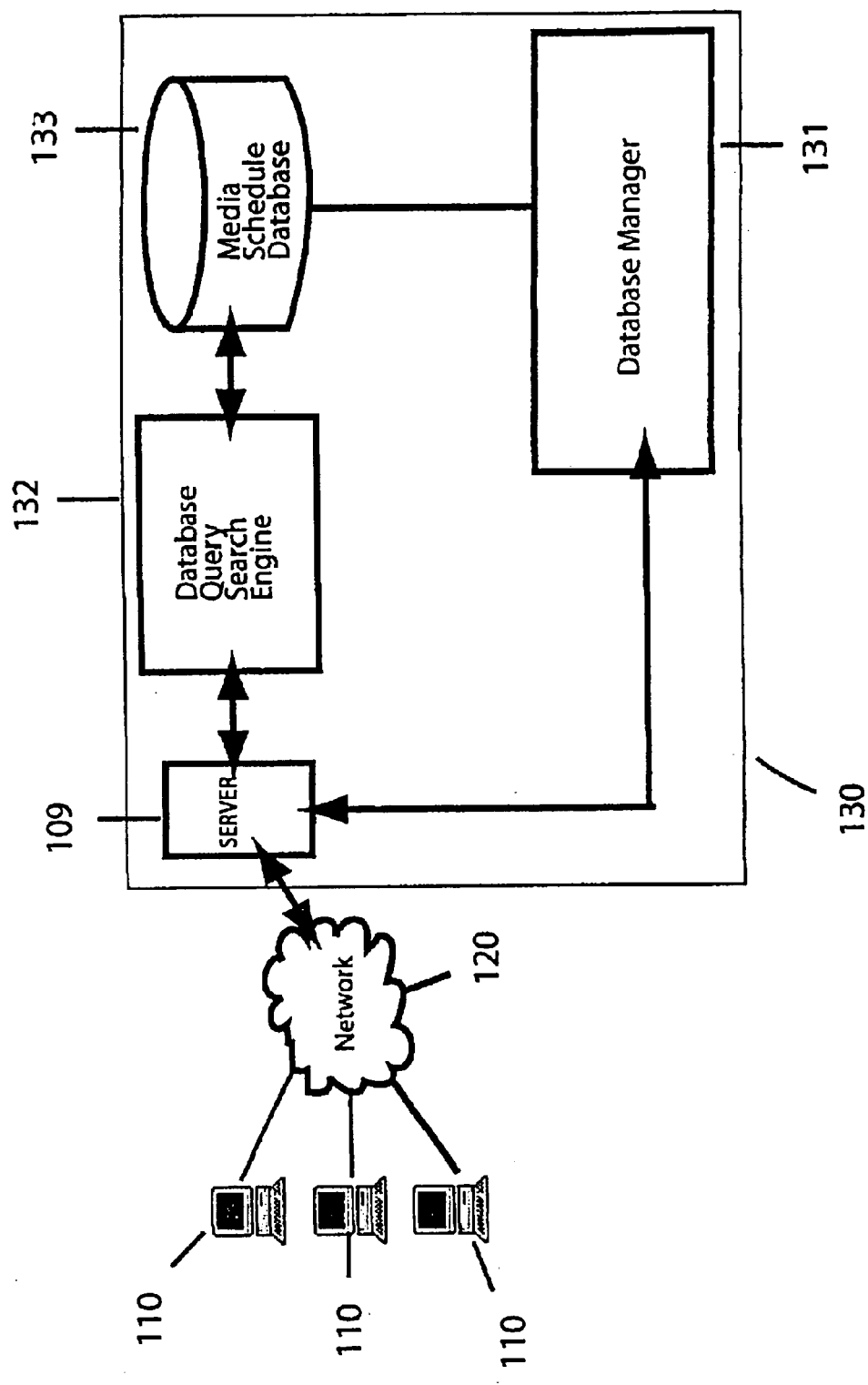
FIG. 1 illustrates a system for managing and providing schedule media information of public persons via a network to users in accordance with one embodiment of the present invention.

The present invention is described in the context of the world wide web. However, the present invention may find application in any networked environment where one or more media schedule databases are accessible to a remote user. In such environments, a schedule information provider having access to at least one database can provide a user with scheduled media events of public persons or scheduled media events to occur in a particular venue, for example, a specific arena or radio station. In the following discussion, the primary context will be the Internet and the world wide web. It is also envisioned for the present invention to find use in providing a user with non-media scheduled events, such as cameo appearances, of public persons or other information.

In the following description for purposes of explanation, specific systems, interconnections, and processing steps are set forth in order to provide a thorough understanding of the present invention. However, it will be appreciated by one skilled in the art that the present invention may be practiced without the specific details disclosed herein.

Glossary of Terms and Acronyms

The following terms and acronyms are used throughout the detailed description:

Hyperlink: A navigational link from one document to another, or from one portion (or component) of a document to another. Typically, a hyperlink is displayed as a highlighted word or phrase that can be selected using a mouse for jumping or linking to the associated document or document portion.

World Wide Web ("Web"): Used herein to refer generally to both (i) a distributed collection of interlinked, user-viewable hypertext documents (commonly referred to as web documents or web pages) that are accessible via the Internet, and (ii) the client and server software components which provide user access to such documents using standardized Internet protocols. The primary standard protocol for allowing applications to locate and acquire web documents is HTTP, and the web pages are encoded using HTML. However, the terms "Web" and "World Wide Web" are intended to encompass markup languages and transport protocols which may be used in place of (or in addition to) HTML and HTTP.

Web Site System: A computer system that provides informational content over a network via a web site using the standard protocols of the World Wide Web. Typically, a web site corresponds to a particular Internet domain name, such as "yahoo.com," and includes the content associated with a particular organization. As used herein, the term "Web Site System" is generally intended to encompass both (i) the hardware/software server components that provide the informational content over the network, and (ii) the "back end" hardware/software components, including any non-standard or specialized components, such as a database and search engines, that interact with the server components to perform services users accessing the web site.

URL (Uniform Resource Locator): A unique address which fully specifies the location of a file or other resource on the Internet. The general format of a URL is protocol:// machine address:port/path/filename. The port specification is optional; if none is entered, the web browser defaults to the standard port for whatever service is specified as the protocol. For example, if HTTP is specified as the protocol, the browser will use the HTTP default port of 80.

System of the Present Invention

FIG. 1 illustrates a system according to the present invention having web site system hardware 130 connected to a plurality of end user computers 110 via a network 120, preferably, the Internet. The web site system hardware 130 includes functional components for allowing users to search for scheduled media activities associated with public persons throughout the world via the Internet 120. Because the number of public persons (e.g., movie stars, celebrities, authors, politicians, athletes, singers, etc.) throughout the world can number in the millions, the web site system hardware 130 is an efficient system for providing users with scheduled media activities of public persons.

Preferably, the web site system hardware 130 is implemented using general purpose computer hardware. The general purpose hardware may advantageously be in the form of a Unix workstation or other suitable computer. The web site system hardware 130 is configured and customized by various software modules. The software modules include communications software of the type conventionally used for Internet communications and a database management system. Any number of commercially available database management systems may be utilized to implement the invention.

Referring to FIG. 1, the web site system hardware 130 includes a database manager 131 for managing media data stored within a media schedule database 133. For example, the database manager 131 is capable of finding relationships between the media data and creating look-up tables, such as mapping a particular public person to scheduled media events corresponding to that particular person. Preferably, the media data includes a plurality of records where each record includes at least a name of a public person and a description of at least one scheduled media activity of the public person. The description of the at least one scheduled media activity may include a time of the scheduled media activity, a venue of the scheduled media activity and a media category of the scheduled media activity.

The database manager 131 is preferably a personal computer system having data management software therein. The database manager 131 is also capable of communicating with a server 109 of the web site system hardware 130 for instructing the server to retrieve media schedule information concerning public persons via the Internet 120, either through a wired connection or a wireless connection.

The web site system hardware 130 further includes a database query search engine 132 for processing queries received from end user computers 110 via the Internet 120. The queries may be received via a wired connection or a wireless connection between the end user computers 110 and the Internet 120. Computers 110 may be a conventional personal computer (PC) running a standard web browser for accessing the Internet 120. In order to access the web site system hardware 130, the web browser establishes a connection to the server 109 having a common gateway interface (CGI) as is known in the art.

Figure 2:
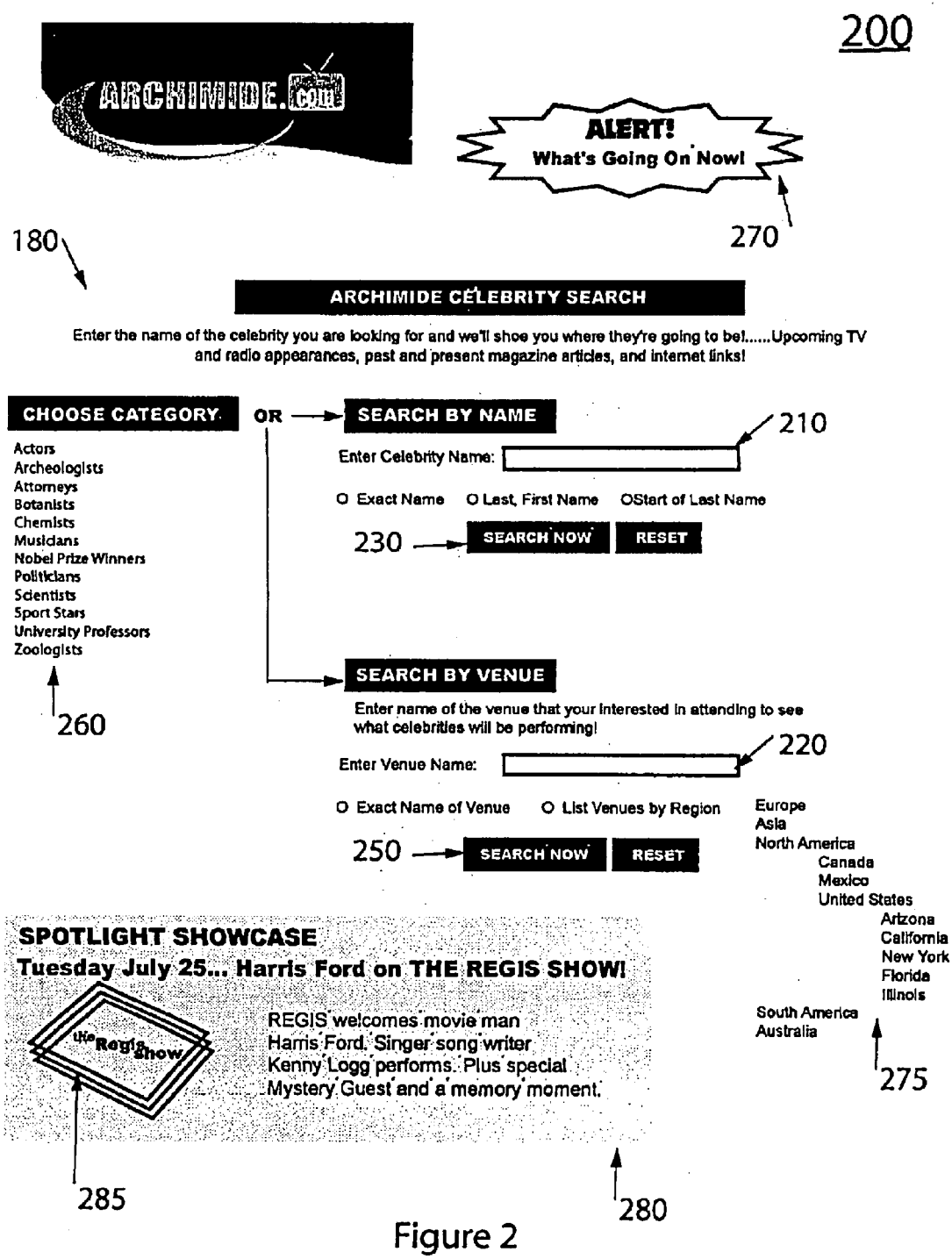
FIG. 2 illustrates a screen display of a home page of a web site maintained and operated by a server of the inventive system as shown by FIG. 1.

Once a connection between a computer 110 and the server 109 is established via the Internet 120, the server 109 transmits to the computer 110 an HTM document representing a web page, preferably, the home page, of a URL associated with the server 109. FIG. 2 illustrates an exemplary home page 200 associated with the server 109. The home page 200 includes search fields for entering information, including user queries for searching the media schedule database 133 for scheduled media activities of public persons. The home page 200 includes name and venue search fields 210, 220 and associated control icons for allowing the user to initiate field-restricted searches of information contained within the media schedule database 133 from a remote location.

A search is preferably performed by typing desired information into one of the search fields 210, 220 and performing a confirming action, such as clicking on one of two "SEARCH NOW" control icons 230, 250. The term or string of terms typed within the search fields 210, 220 and which is transmitted to the database query search engine 132 for processing is referred to herein as the "query."

It is contemplated that additional search fields can be provided on the home page 200 or another web page associated with the same URL as the home page 200, such as a date field, where a date can be entered for retrieving media activities of public persons scheduled to occur on the particular date entered. It is also contemplated to provide a search field where two or more types of search data can be commingled, such as a search field where a date, a location, and a name of a public person can be entered.

The home page 200 as shown by FIG. 2 also includes on the left part of the screen a list of user-selectable categories 260. If a category is selected from the list 260, a user is provided with a list of public persons which fit the category and their corresponding scheduled media activities are obtained from the media schedule database 133. For example, if a user selects the "politicians" category, the user is provided with a list of politicians and their corresponding scheduled media activities. It is contemplated that only the scheduled media activities scheduled to occur within a predetermined time in the future are displayed. For example, only the scheduled media activities scheduled to occur within the next month. It is further contemplated that upon a user selecting a category, sub-categories are provided for further refining the search. For example, sub-categories which could be provided include Alabama politicians, New York State politicians, and foreign politicians. A sub-category selected could then provide additional categories for further refining the search. For example, if the sub-category New York State politicians is selected, the following categories could then be provided: New York City Council Members, New York State Assemblymen, New York State Senators, and Suffolk County Legislature Members.

If a user sees a scheduled media activity of a particular public person and desires to be reminded of the particular scheduled media activity at a particular time in the future, e.g., one day before the media activity is scheduled to occur, the user can instruct the server 109 to send an e-mail or facsimile reminder letter. The user can accomplish this by clicking a "reminder" icon appearing in proximity to the particular scheduled media activity the user desires to be reminded of. If the user has registered with the web site, the server 109 is programmed to automatically acknowledge the identity and corresponding information for contacting the user, upon the user clicking the "reminder" icon. The server 109 is also programmed to appropriately send an e-mail or facsimile reminder letter to the user at the particular time in the future.

The home page 200 also includes an "Alert" display 270 for alerting users, once the users click on the display 270, to scheduled media activities of public persons currently taking place or scheduled to occur in the immediate future, e.g., within 24–48 hours. It is contemplated that once the "Alert" display 270 is clicked, only events are provided which are currently taking place or scheduled to occur in a given location and/or include a public person of interest to the user. Accordingly, with the system of the present invention, the user provides the locations and/or names of public persons to the web site system hardware 130 of which the user desires to be alerted of by clicking the "Alert" display 270. It is also contemplated for the location to be further defined by the user, e.g., within 50 miles of the user's address.

If there are any web casts currently taking place which feature a public person, the web site system hardware 130 provides a hyperlink for accessing the web site featuring the web cast once the "Alert" display 270 is clicked. It is contemplated that the web site system hardware 130 is programmed to automatically provide information regarding the user accessing the web cast to the web site system hardware operating the web cast once the user clicks the hyperlink, such that the user does not have to provide any identifying information once the user is connected to the web site featuring the web cast. Hence, the user is automatically provided with the web cast.

It is contemplated that the media schedule database 133 includes a library of web casts of lectures, speeches, etc. given by public persons which were previously telecast for users to access and view. Preferably, the users are charged a fee for accessing and viewing the web casts. The database manager 131 keeps track of web casts accessed and viewed by particular users, in order to allocate a percentage of the fee to the copyright owner of the web cast, e.g., a university or the public person, or other entity. The remaining percentage of the fee is allocated to the owner or operator of the web site system hardware 130.

Additionally, the home page 200 also includes on the right part of the screen a list of user-selectable locations 275. If a location is selected from the list 275, a user is provided with a list of public persons which are to appear at that location and their corresponding scheduled media activities as obtained from the media schedule database 133. For example, if a user selects "New York", the user is provided with a list of public persons scheduled to appear in New York and their corresponding scheduled media activities. It is contemplated that only the scheduled media activities scheduled to occur within a predetermined time in the future are displayed. For example, only the scheduled media activities scheduled to occur within the next month.

If a user sees a scheduled media activity of a particular public person and desires to be reminded of the particular scheduled media activity at a particular time in the future, e.g., one day before the media activity is scheduled to occur, the user can instruct the server 109 to send an e-mail or facsimile reminder letter, as described above with the list of userselectable categories 260.

It is contemplated that once a user clicks on a particular location, the location is further defined. For example, if the user clicks "New York", the user is then provided with locations within New York, such as Buffalo, Syracuse, New York City, Hicksville, etc. The user can then click one of these locations to further refine the search. It is further contemplated that once one of these locations is clicked, the user is then provided with venues, such as universities, hospitals, malls, bookstores, office complex, etc. The user can then click one of these venues to further refine the search. Yet still, it is further contemplated that once one of these venues is clicked, the user is then provided with the name of the public person and/or the type of activity, such as book signing, movie premier, autograph session, etc.

In addition to the name and venue fields 210, 220, associated control icons 230, 250, user-selectable lists 260, 275, and "Alert" display 270 included in FIG. 2, the home page 200 further includes at least one display field 280. The display field 280 can advertise a particular media announcement or a promotion, such as a sweepstakes contest, a vacation package to attend a public event featuring a public person, etc. In a conventional manner, the user can select the display field 280 by performing a confirming action, such as clicking the display field 280 with a mouse button, to obtain additional information about the particular media announcement or promotion.

It is also contemplated to provide clickable icons within the display field 280 which can hyperlink the user to another URL. For, example by clicking an icon of a sale tag or ticket, the user is hyperlinked to a URL where the user can purchase merchandise, purchase tickets or register for a public event. The public event could be the public event advertised within the display field 280 or another public event.

It is further contemplated for the database manager 131 to keep track of users who hyperlinked to other URLs from the home page 200 or another web page associated with the same URL as the home page 200. Further still, it is contemplated for the database manager 131 to store the type of actions a particular user undertook when he/she hyperlinked to another URL, such as the purchase of tickets, registration to a media event, etc. If the action involved a sales transaction or a commitment for a sales transaction in the immediate future, the database manager 131 is provided with such information, e.g., by e-mail, from the operator or owner of the URL where the sales transaction or commitment for a future sales transaction occurred. An operator of the web site system hardware 130 can then periodically invoice, e.g., by e-mail, the operator or the owner of the URL where the sales transaction or the commitment for a future sales transaction occurred following the sales transaction for a percentage of the sales transaction.

Additionally, the operator of the web site system hardware 130 could charge a flat fee to the advertiser or promoter of the contents displayed by the display field 280 based on various factors, such as the size of the display field 280, the length of time the display field 280 is displayed, and the time-of-day the display field 280 is displayed. The operator of the web site system hardware 130 could charge a variable fee to the advertiser or promoter of the contents displayed by the display field 280 based on the number of hits the display field 280 receives and/or the number of sales transactions as a result of a user clicking on the display field 280 and linking to a sales transaction web page for purchasing tickets, merchandise, etc.

Preferably, the display field 280 also includes several icons, such as icon 285, for learning about the media activities associated, for instance, with The Regis Show, which may include, for example, broadcast times of the television show, guests that will appear on the show, and public appearances of the host(s). This information could be provided by a pop-up window, by retrieving information stored within the media schedule database 133, by hyperlinking to a URL associated with The Regis Show, etc.

Figures 3, 3A, 3B, 3C:
FIGS. 3a–3c illustrate data entry screen displays provided by the server of the inventive system for determining a user's service provider(s) and geographic location.

Referring now to FIGS. 3a–3c, when a search session is first established with a user, i.e., prior to a user entering a search query via one of the search fields 210, 220, the user is preferably shown a display screen as illustrated by FIG. 3a. The user may be optionally or mandatorily required to enter a zip code to allow the web site system hardware 130 to provide information associated with geographic area represented by the zip code entered, e.g., television programming including name of shows and air times capable of being viewed by persons in the geographic area, appearances of public persons in the geographic area or vicinity thereof in the future, special events scheduled to take place in the geographic area or vicinity thereof, etc.

Subsequent to the display of the screen shown by FIG. 3a, a user is then preferably shown the display screen of FIG. 3b which requires the user to select a television service type used in the user's place of residence. FIG. 3b illustrates three television service type options: cable 310, satellite 312, and broadcast 314. Subsequent to making a selection using the screen shown by FIG. 3a, the user is then preferably shown the screen of FIG. 3c which requires the user to select a cable service provider. FIG. 3c illustrates two exemplary cable service providers: Acme cable systems 316, and Metro cable systems 318. The data submitted by the user via the entries displayed in FIGS. 3a–3c may be used, if the user so desires based upon confirmation, in all subsequent user queries, in order to return data appropriate to the user's desired geographic area and service provider.

The database query search engine 132 processes the user query, which is either a name query, a venue query, according to whether the query was entered in the name or venue search field, or a combination query as contemplated above, and accordingly searches the media schedule database 133. The media schedule database 133 includes, for example, information including the time, place, venue (e.g., television, radio station, arenas, bookstores, etc.) and a media activity description for public persons throughout the world. The information for each item is arranged within fields (e.g., a "time" field and a "place" field), enabling the media schedule database 133 to be searched on a field-restricted basis. It is contemplated that other type of mapping of the data within the media schedule database 133 and query searching could be implemented using database management routines as known in the art.

Query search results are displayed by a display to the user, as shown in FIG. 4, and designated generally by reference numeral 400. If a query search term does not produce a query search result, the display will provide a message indicating that no search results were found based on the entered query. In an effort to appease the user by finding at least one query search result where no search results are evident, it is contemplated for the database manager 131 to refine the query and resubmit the refined query to the media schedule database 133. For example, the query could be refined by using a geographic location within a predetermined distance of the originally entered geographic location in the venue field 220.

With continued reference to FIG. 4, query search results include one or more of elements 401, 403, 405, 407 and 409. Each query search result specifies a particular media category, e.g., television, magazines, Internet, radio and live appearances, including time and place information, as well as issue information in case of a publication.

In the particular example shown by FIG. 4, the query search results 400 relate to media activities for actress Serena Roberts as indicated in a top heading 420. Element 401 lists three scheduled television appearances by Serena Roberts: a first appearance 401a which describes an appearance on The Regis Show including date, place and time information (i.e., Aug. 12, 2000, channel 7 at 9:00 am); a second appearance 401b on Latenight With Lefty Letterman; and a third appearance 401c on Good Morning New York. Element 403 lists current magazine issues featuring an article which mentions Serena Roberts. In the example, two magazines are listed: the August issue of Peek magazine 403a and the September issue of Interview Now magazine 403b.

Element 405 displays an Internet-related event. In this particular example as shown by FIG. 4, element 405 displays an AOL live chat event which will feature Serena Roberts and which is scheduled to take place on Aug. 4, 2000 at 7:00 pm. Element 407 is a listing of a radio media event. In particular, element 407 provides a listing of a radio interview with Serena Roberts on the Herman Stem Show on August 10 where the time is to be announced. Finally, element 409 describes a live appearance that Serena Roberts will make at the Broadway Mall in Atlanta, Ga. on Aug. 8, 2000 from 8–9 am.

Query search results 400 may also provide a hyperlink connection upon selection of a particular icon, word or term. For example, by the term "Broadway Mall" may provide a hyperlink to a URL associated with the Broadway Mall of Atlanta, Ga., in order to provide further information about the mall and the appearance of Serena Roberts thereat. Further, the term "Broadway Mall" may provide a hyperlink to a LURL associated with selling tickets to the event, in order for a prospective attendee to purchase tickets to the event. It is contemplated that the operator or owner of the URL associated with the web site system hardware 130 is compensated for any sales transaction which occurs due to a hyperlink connection from the page featuring the query search results 400; similarly to being compensated for any sales transaction occurring via the display field 280 as discussed above.

It is contemplated that a celebrity's publicist or manager is provided with an access code for accessing the media schedule database 133 for providing media activity information regarding one or more celebrities, and for revising, appending, deleting, etc. data stored within the media schedule database 133 pertaining to the celebrity the publicist or manager is representing.

While the system has been described with reference to a preferred embodiment particularly suited for public persons. It is to be understood that the system according to the invention is suitable for other applications including the display of schedule information for any person or persons of interest to a community of users. For example, it is contemplated that the present invention may be employed on a company intranet to track the schedule of officers of a corporation. Another example include a college or university where the persons of interest may include faculty and administration. Access may be provided to all members of the college community or provided on a restricted basis. These examples are not meant to be restrictive of the intended applications, but rather as illustrative examples of the applicability of the present invention, For example, one distinctive application is to allow users to be able to add or append the media schedule database 133 with information regarding media activities of public persons which may have inadvertently or purposely come to the attention of the users. This information can then be provided to subsequent users with the caveat that the information has not been verified with the public persons or their representatives.

It is also contemplated to notify a user via e-mail whenever information corresponding to a public person of which the user has an interest in is updated in the media schedule database 133. The e-mail could include the updated information and/or could include a hyperlink to the web site maintained or operated by the server 109 of the web site system hardware 130 for viewing the updated information.

Accordingly, it is to be understood that various modifications may be made to the embodiments disclosed herein, and that the above descriptions should not be construed as limiting, but merely as exemplifications of preferred embodiments. Those skilled in the art will envision other modifications within the scope and spirit of the claims appended hereto.

What is claimed is:

1. An information processing system for centralizing and managing media schedule data and providing the media schedule data in response to a search query entered via a graphical user interface accessible by a plurality of users and received by said system via a network connection from a remote computer terminal corresponding to one of the plurality of users, said information processing system comprising:

a server connected to a network via the network connection for receiving the search query;

a media schedule database containing media schedule data comprising a plurality of records, each record of the plurality of records including at least a name of a person and at least a time and/or place description of the occurrence of at least one media activity of said person, wherein said at least one media activity is selected from the group consisting essentially of broadcast events, such as radio, television and web broadcast events, and non-broadcast events, such as a live appearance at a particular venue, wherein at least one media activity of said at least one media activity is scheduled to take place in a future time, wherein at least two non-related media activities of said at least one media activity can overlap in time such that said person is scheduled to appear simultaneously in two different venues of a plurality of venues during the time overlap, such as a television program and a particular location, and wherein one of the two different venues can be a particular venue for the live appearance; and a database query search engine configured for receiving the search query from the server and for searching the media schedule database for obtaining at least one record of the plurality of records approximately satisfying the search query.

2. An information processing system for centralizing and managing media schedule data and providing the media schedule data in response to a search query entered via a graphical user interface accessible by a plurality of users and received by said system via a network connection from a remote computer terminal corresponding to one of the plurality of users, said information processing system comprising:

a server connected to a network via the network connection for receiving one of the search query and media schedule data from the remote computer terminal, wherein said media schedule data includes at least a name of a person and at least a time and/or place description of the occurrence of at least two non-related media activities of said person, wherein said at least two non-related media activities are selected from the group consisting essentially of broadcast events, such as radio, television and web broadcast events, and non-broadcast events, such as a live appearance at a particular venue, and wherein at least one non-related media activity of said at least two non-related media activities is scheduled to take place in a future time;

a media schedule database containing stored media schedule data comprising a plurality of records, each record of the plurality of records including at least a name of a person and a time and/or place description of the occurrence of at least two non-related media activities of said person, wherein said at least two non-related media activities are selected from the group consisting essentially of broadcast events, such as radio, television and web broadcast events, and non-broadcast events, such as a live appearance at a particular venue, wherein at least one non-related media activity of said at least two non-related media activities is scheduled to take place in a future time, wherein said at least two non-related media activities can overlap in time such that said person is scheduled to appear simultaneously in two different venues of a plurality of venues during the time overlap, such as a television program and a particular location, and wherein one of the two different venues can be a particular venue for the live appearance; and a database query search engine configured for receiving the search query from the server and for searching the media schedule database for obtaining at least one record of the plurality of records approximately satisfying the search query.

3. The system according to claim 2, further comprising a database manager having application software for managing the plurality of records, for instructing the server to receive media schedule data from at least one remote computer terminal, for processing media schedule data received by the server, and for transmitting the processed media schedule data to the media schedule database.

4. The system according to claim 2, further comprising application software for instructing said server to retrieve media schedule data from at least one remote computer terminal.

5. The system according to claim 2, wherein said description of one non-related media activity of said at least two non-related media activities includes at least a date, at least one venue from the plurality of venues, and a media category.

6. The system according to claim 2, wherein one of the plurality of venues includes one of a television program, a particular location, a multimedia program, such as a webcast, and a radio program.

7. The system according to claim 2, wherein the at least two non-related media activities are characterized as media activities wherein the person would be appearing at two respective venues of the plurality of venues, the two respective venues of the plurality of venues being the same or two different venues.

8. A method for providing media schedule data in response to a user-submitted query over a communication network, said method comprising the steps of:

searching a media schedule database comprising a plurality of records, each record of the plurality of records including media schedule data having at least a name of a person and at least a time and/or place description of the occurrence of at least two non-related media activities of said person, wherein said at least two non-related media activities are selected from the group consisting essentially of broadcast events, such as radio, television and web broadcast events, and non-broadcast events, such as a live appearance at a particular venue, wherein one of said at least two non-related media activities is scheduled to take place in a future time in one of a plurality of venues, and retrieving a record approximately satisfying the user-submitted query, wherein said at least two non-related media activities can overlap in time such that said person is scheduled to appear simultaneously in two venues of said plurality of venues during the time overlap, such as a television program and a particular location, and wherein one of the two different venues can be a particular venue for the live appearance; and transmitting at least a portion of the media schedule data of the retrieved record to a remote computer terminal via the communication network.

9. A method for providing media schedule data in response to a user-submitted query over a communication network and for receiving media schedule data from at least one user who is not an operator of said method, said method comprising the steps of:

searching a media schedule database comprising a plurality of records, each record of the plurality of records including media schedule data having at least a name of a person and at least a time and/or place description of the occurrence of at least two non-related media activities of said person, wherein said at least two non-related media activities are selected from the group consisting essentially of broadcast events, such as radio, television and web broadcast events, and non-broadcast events, such as a live appearance at a particular venue, wherein one of said at least two non-related media activities is scheduled to take place in a future time in one of a plurality of venues, and retrieving a record approximately satisfying the user-submitted query, wherein said at least two non-related media activities can overlap in time such that said person is scheduled to appear simultaneously in two different venues of said plurality of venues during the time overlap, such as a television program and a particular location, and wherein one of the two different venues can be a particular venue for the live appearance;

transmitting at least a portion of the media schedule data of the retrieved record to a remote computer terminal via the communication network; and processing the received media schedule data and storing the processed media schedule data within said media schedule database.

10. The method according to claim 9, wherein said description of the at least one non-related media activity includes at least a date, at least one venue from the plurality of venues, and a media category, and wherein one of the plurality of venues includes one of a television program, a particular location, a multimedia program, such as a web cast, and a radio program.

11. A method for centralizing and managing media schedule data and providing the media schedule data in response to a search query entered via a graphical user interface accessible by a plurality of users and received by said system via a network connection from a remote computer terminal corresponding to one of the plurality of users, said method comprising the steps of:

receiving the search query from the remote computer terminal;

maintaining a media schedule database comprising a plurality of records, each record of the plurality of records including media schedule data; and searching the media schedule database and retrieving at least one record of the plurality of records approximately satisfying the search query;

wherein said media schedule data includes at least a name of a person and at least a time and/or place description of the occurrence of at least one media activity of said person, wherein said at least one media activity is selected from the group consisting essentially of broadcast events, such as radio, television and web broadcast events, and non-broadcast events, such as a live appearance at a particular venue, wherein at least one media activity of said at least one media activity is scheduled to take place in a future time, wherein at least two non-related media activities of said at least one media activity can overlap in time such that said person is scheduled to appear simultaneously in two different venues of a plurality of venues during the time overlap, such as a television program and a particular location, and wherein one of the two different venues can be a particular venue for the live appearance.

12. The method according to claim 11, further comprising the steps of:

receiving a location and/or name of a person from the remote computer terminal; and providing media schedule data to the remote computer terminal via the network connection, wherein the media schedule data is related to the received location and/or person.

13. The method according to claim 11, further comprising the step of transmitting to the remote computer terminal a reminder message relating to the contents of at least one record of the plurality of records of said media schedule database.

14. The method according to claim 11, further comprising the steps of:

providing a plurality of user-selectable locations on said graphical user interface; and presenting at least a name of a person and a description of at least one media activity of said person, upon a selection of one of said plurality of user-selectable locations, wherein said person is scheduled to appear in the selected location.

15. The method according to claim 14, further comprising the step of providing at least one sub-category upon selection of said one of said plurality of user-selectable categories, prior to the presenting step.

16. The method according to claim 11, further comprising the steps of:

providing a plurality of user-selectable categories on said graphical user interface; and presenting at least a name of a person and a description of at least one media activity of said person, upon a selection of one of said plurality of user-selectable categories, wherein said person belongs to the selected user-selectable category.

17. The method according to claim 16, further comprising the step of providing at least one sub-category upon selection of said one of said plurality of user-selectable categories, prior to the presenting step.

18. The method according to claim 11, further comprising the steps of:

connecting the remote computer terminal to a network location via the network connection for enabling said one of the plurality of users to perform at least one action at the network location; and invoicing an operator of the network location, if said at least one action includes a sales transaction, for a percentage of the sales transaction.

19. The method according to claim 11, further comprising the steps of:

receiving media schedule data from at least one remote computer terminal;

processing the received media schedule data; and storing the processed media schedule data within said media schedule database.

20. A method for centralizing and managing media schedule data and providing the media schedule data in response to a search query entered via a graphical user interface accessible by a plurality of users and received by said system via a network connection from a remote computer terminal corresponding to one of the plurality of users, said method comprising the steps of:

receiving one of the search query and media schedule data from the remote computer terminal, wherein said media schedule data includes at least a name of a person and at least a time and/or place description of the occurrence of at least two non-related media activities of said person, wherein said at least two non-related media activities are selected from the group consisting essentially of broadcast events, such as radio, television and web broadcast events, and non-broadcast events, such as a live appearance at a particular venue, and wherein one non-related media activity of said at least two non-related media activities is scheduled to take place in a future time, wherein said at least two non-related media activities can overlap in time such that said person is scheduled to appear simultaneously in two different venues of a plurality of venues during the time overlap, such as a television program and a particular location, and wherein one of the two different venues can be a particular venue for the live appearance;

maintaining a media schedule database comprising a plurality of records, each record of the plurality of records including media schedule data; and searching the media schedule database and retrieving at least one record of the plurality of records approximately satisfying the search query.

21. The method according to claim 20, further comprising the steps of:

receiving a location and/or name of a person from the remote computer terminal; and providing media schedule data to the remote computer terminal via the network connection, wherein the media schedule data is related to the received location and/or person.

22. The method according to claim 20, further comprising the step of transmitting to the remote computer terminal a reminder message relating to the contents of at least one record of the plurality of records of said media schedule database.

23. The method according to claim 20, further comprising the steps of:

providing a plurality of user-selectable locations on said graphical user interface; and presenting at least a name of a person and a description of at least one media activity of said person, upon a selection of one of said plurality of user-selectable locations, wherein said person is scheduled to appear in the selected location.

24. The method according to claim 23, further comprising the step of providing at least one sub-category upon selection of said one of said plurality of user-selectable categories, prior to the presenting step.

25. The method according to claim 20, further comprising the steps of:

providing a plurality of user-selectable categories on said graphical user interface; and presenting at least a name of a person and a description of at least one media activity of said person, upon a selection of one of said plurality of user-selectable categories, wherein said person belongs to the selected user-selectable category.

26. The method according to claim 25, further comprising the step of providing at least one sub-category upon selection of said one of said plurality of user-selectable categories, prior to the presenting step.

27. The method according to claim 20, further comprising the steps of:

connecting the remote computer terminal to a network location via the network connection for enabling said one of the plurality of users to perform at least one action at the network location; and invoicing an operator of the network location, if said at least one action includes a sales transaction, for a percentage of the sales transaction.

28. The method according to claim 20, further comprising the steps of:

retrieving media schedule data from at least one remote computer terminal;

processing the retrieved media schedule data; and storing the processed media schedule data within said media schedule database.

29. The method according to claim 20, wherein the search query contains one of a name of a person, a venue, a date, and a combination thereof.

30. The method according to claim 20, wherein said description of one non-related media activity of said at least two non-related media activities includes at least a date, at least one venue from the plurality of venues, and a media category.

31. The method according to claim 20, wherein one of the plurality of venues includes one of a television program, a particular location, a multimedia program, such as a web cast, and a radio program.

* * * * *